(12) United States Patent
Faerber

(10) Patent No.: US 7,359,355 B2
(45) Date of Patent: Apr. 15, 2008

(54) METHOD FOR TRANSFERRING INTERSYSTEM CONNECTIONS

(75) Inventor: Michael Faerber, Wolfratshausen (DE)

(73) Assignee: Siemens Aktiengesellschaft, Munich (DE)

( * ) Notice: Subject to any disclaimer, the term of this patent is extended or adjusted under 35 U.S.C. 154(b) by 860 days.

(21) Appl. No.: 10/182,874

(22) PCT Filed: Jan. 29, 2001

(86) PCT No.: PCT/DE01/00343

§ 371 (c)(1),
(2), (4) Date: Aug. 1, 2002

(87) PCT Pub. No.: WO01/58197

PCT Pub. Date: Aug. 9, 2001

(65) Prior Publication Data

US 2003/0031143 A1    Feb. 13, 2003

(30) Foreign Application Priority Data

Feb. 1, 2000  (DE) ................ 100 04 278

(51) Int. Cl.
H04L 12/28 (2006.01)
H04Q 7/00 (2006.01)
H04Q 7/20 (2006.01)
H04M 1/00 (2006.01)

(52) U.S. Cl. ............... 370/332; 370/395.21; 370/329; 455/436; 455/452.21

(58) Field of Classification Search ............ 370/331, 370/328, 329, 332, 333, 338, 352; 455/436, 455/437, 438, 442, 443, 453
See application file for complete search history.

(56) References Cited

U.S. PATENT DOCUMENTS 5,276,906 A    1/1994  Felix
6,101,176 A *  8/2000  Honkasalo et al. ......... 370/335

(Continued)

FOREIGN PATENT DOCUMENTS

EP    0948231    10/1999

(Continued)

OTHER PUBLICATIONS

ETSI TS 125 215 V3.1.1 (Jan. 2000), Universal Mobile Telecommunications System (UMTS); Physical Layer-Measurements (FDD) (3G TS 25.215 Version 3.1.1 Release 1999), XP-002171846, pp. 1-20.

(Continued)

Primary Examiner—Hanh Nguyen
(74) Attorney, Agent, or Firm—Staas & Halsey LLP

(57) ABSTRACT

To transfer intersystem connections, the quality of a transfer to a supplying base station in a first radiocommunication system is determined at a given moment by a subscriber station and compared to a threshold value. If the value falls below said threshold, a compressed mode is activated and measurements are carried out by the subscriber station in relation to the transfer qualities to neighboring base stations in a second radiocommunication network. On the basis of said measurements, the subscriber station selects a base station for the transfer of a connection. If the value falls below the second threshold, information sequences in the organization channels of the selected base stations are detected by the subscriber station.

16 Claims, 3 Drawing Sheets

U.S. PATENT DOCUMENTS

| | | | | |
|---|---|---|---|---|
| 6,208,631 | B1 * | 3/2001 | Kim | 370/332 |
| 6,490,452 | B1 * | 12/2002 | Boscovic et al. | 455/436 |
| 6,788,665 | B1 * | 9/2004 | Vancraeynest | 370/337 |
| 7,020,184 | B2 * | 3/2006 | Yuen | 375/152 |

FOREIGN PATENT DOCUMENTS

| | | |
|---|---|---|
| GB | 2297460 | 7/1996 |
| WO | WO94/29981 | 12/1994 |
| WO | WO96/23369 | 8/1996 |

OTHER PUBLICATIONS

UMTS 30.06 Version 3.0.0, TR 101 146 V3.0.0 (Dec. 1997), XP-002171845, pp. 48-50.

TS 25.231 V0.3.0 (Jun. 1999), "3rd Generation Partnership Project (3GPP); Technical Specification Group (TSG) Radio Access Network (RAN); Working Group 1 (WG1); Physical Layer-Measurements", pp. 11-16.

3G TS 25.215 V3.1.1 (Dec. 1999), "3rd Generation Partnership Project; Technical Specification Group Radio Access Network; Physical Layer-Measurements (FDD) (3G TS 25.215 Version 3.1. 0", pp. 6-18.

3G TS 25.215 V3.1.1 (Dec. 1999), "3rd Generation Partnership Project; Technical Specification Group Group Radio Access Network; Multiplexing and Channel Coding (FDD) (3G TS 25.215 Version 3.1.0", pp. 43-47.

* cited by examiner

METHOD FOR TRANSFERRING INTERSYSTEM CONNECTIONS

CROSS REFERENCE TO RELATED APPLICATIONS

This application is based on and hereby claims priority to PCT Application No. PCT/DE01/00343 filed on Jan. 29, 2001 and German Application No. 100 04 278.3 filed on Feb. 1, 2000, the contents of which are hereby incorporated by reference.

BACKGROUND OF THE INVENTION

The invention relates to a method for transferring intersystem connections, in particular between two asynchronous radiocommunication systems. The invention is particularly suited to use in a mobile communication system or wireless subscriber line system.

In radiocommunication systems, for example in the second generation European mobile communication system GSM (Global System for Mobile Communications), information such as voice, image information or other data for example is transmitted via a radio interface using electromagnetic waves. The radio interface relates to a connection between a base station and a plurality of subscriber stations, wherein the subscriber stations may be mobile stations or fixed radio stations for example. The electromagnetic waves are emitted in this case using carrier frequencies lying in a frequency band provided for the respective system. For future radiocommunication systems, for example the UMTS (Universal Mobile Telecommunications System) or other third generation systems, frequencies are provided in the frequency band of approximately 2000 MHz. Two modes are provided for the third generation mobile communication system UMTS, with one mode delineating an FDD (frequency division duplex) mode and the other mode delineating a TDD (time division duplex) mode. Said modes are used in different frequency bands, with both modes supporting a so-called CDMA (Code Division Multiple Access) subscriber separation method.

For the observation of GSM radio cells based on the FDD mode of the third generation digital mobile communication system UMTS at the time of application, the following documents form the basis for international 3GPP standardization:

D1: TS 25.212 "Multiplexing and channel coding (FDD)", V3.1.1, 1999-12, especially Chapter 4.4 "Compressed mode", D2: TS 25.215 "Physical layer—Measurements (FDD)", V3.1.1, 1999-12, especially Chapter 6 "Measurements for UTRA FDD", and D3: RAN 25.231 "Physical layer—Measurements", V0.3.0, 1999-06, especially Chapter 5.1.3 ff. "Measurements for the handover preparation from UTRA FDD at the UE".

Descriptions of the second generation mobile communication system GSM are based on the book by J. Biala "Mobilfunk und Intelligente Netze", Vieweg Verlag, 1995.

Owing to a co-existence and a desired harmonization between second and third generation radiocommunication systems, subscriber stations that have established a connection in one radiocommunication system should be provided with the capability to transfer the connection to a further radiocommunication system which in some cases may support a different transmission mode. An intersystem connection transfer of this type, also referred to as intersystem handover, requires that prior to the transfer the subscriber station must already be synchronized with the radiocommunication system that is to take over the connection. For this reason, signals of a so-called synchronization channel (SCH) are transmitted periodically by the base stations of the radiocommunication system in the radio coverage area, by which signals a subscriber station can synchronize with the time structure of the radio interface of the radiocommunication system and can subsequently carry out measurements, for example regarding the receiving level, which are taken into account for the transfer decision.

The FDD mode of the UMTS mobile communication system is based on a so-called W-CDMA subscriber separation method which is characterized by continuous transmitting and receiving on designated broadband transmission channels. In contrast to the known time slot structure of the GSM mobile communication system and of the TDD mode of the UMTS mobile communication system, no dedicated transmission pauses for measuring adjacent radio cells or parallel mobile communication systems operating in a different frequency band are available to a subscriber station in the FDD mode when changing over between transmitting and receiving.

One solution to this problem is the realization of a second receiving device in the subscriber station, but this disadvantageously results in increased costs, an additional space requirement as well as a higher power consumption of the subscriber station.

For this reason a concept was realized according to which a subscriber station having only one receiving device is also capable of detecting signals in other frequency bands, and of using them for example for an intrasystem or intersystem connection transfer. This concept is termed "compressed mode" and is explained inter alia in the referenced documents D1 to D3. With this mode, within a time frame of 10 ms, the information contained therein is compressed, inter alia by various methods such as puncturing and changing the spreading factor, in such a way that a transmission gap of a specific length is produced. Within said transmission gap, the subscriber station can tune the receiving device to another frequency band and receive and evaluate signals transmitted therein. The "compressed mode" can be performed both in the uplink direction and in the downlink direction.

However, this concept also has disadvantages because, for example, a higher transmitting power becomes necessary as a result of the reduction of the spreading factor in order to ensure a constant transmission quality. This increased transmitting power leads to increased interference disruption between connections concurrently established in the same frequency band.

Moreover, the concept disadvantageously breaks the closed loop for transmit power control. This runs counter to the principle of a DS-CDMA system (Direct Sequence CDMA), which requires a very fast and precise transmit power control for the uplink direction to ensure optimal capacity of the system by minimizing the respective transmitting power of the subscriber stations.

The number and periodicity of the time frames with transmission gaps are individually adjusted on the network side depending on the respective conditions and the current need for observing other frequency bands or systems.

As the future UMTS mobile communication system starts to become widespread, so-called multimode subscriber stations will support at least both the GSM standard and the FDD mode of the UMTS standard. This is important primarily for operators who implement, for example, both comprehensive coverage of an entire country with a GSM mobile communication system and an initially locally restricted coverage with the UMTS mobile communication system.

In comparison to the UMTS mobile communication system, the GSM mobile communication system has a significantly smaller frequency channel spacing—200 kHz in comparison to 5 MHz with FDD mode—as well as a greater frequency reuse factor—typically 7 as opposed to 1. This requires the observation of a greater number of adjacent radio cells, which must be observed in the case of an intersystem connection transfer from an FDD mode to a GSM system.

According to the GSM standard, for example the receiving level (RSSI—Received Signal Strength Indicator) of up to 32 adjacent cells must be observed by the subscriber station within a period of 30 seconds, and the six adjacent cells that offer the best transmission conditions must be signaled every 480 milliseconds to the currently supplying base station. In addition to this observation of the respective receiving levels, information of the respective control channel (BCCH—Broadcast Control Channel) must also be decoded and evaluated.

In the GSM mobile communication system, this problem is solved by averaging the measured RSSI within a respective time frame (4.6 ms) and by using a so-called idle frame, that is to say a time frame in which no transmission takes place, for detecting information of a selected radio cell.

In contrast, a subscriber station with a connection established in the FDD mode of the UMTS standard has no recourse to such concentrated measurements since a regular use of the compressed mode would lead to a significant reduction in the transmission quality. For this reason, it is anticipated that no generation of transmission gaps with a periodicity of 120 ms will be provided in the FDD mode.

The transmission gaps can however be used to observe a plurality of frequency bands in each case. In comparison with high-periodicity observation, this is more efficient since the required times for controlling the receiving device cause corresponding losses. Nevertheless, one entire transmission gap should be used exclusively for detecting the information of the control channel of an adjacent GSM radio cell.

Owing to the negative impact on the transmission quality set forth above, the compressed mode is not used permanently but rather, for example, the beginning and the extent of the measurements for a calculated need, to maintain an established connection for example, are determined and signaled to the subscriber station. For this decision regarding an activation or deactivation of the compressed mode, the use of a threshold value with which the respective current transmission quality of the connection is compared is proposed.

One disadvantage of this solution for controlling the connection transfer from the FDD mode to the GSM standard lies in its need for a large number of measurements with a concomitant decoding of information, resulting inter alia from the large frequency reuse factor and the large number of frequency channels.

With the aid of a diagram, FIG. 2 illustrates the effect of shifting the threshold value Th for the transmission quality. The transmission quality Q is plotted here against a signal-to-noise ratio (Eb/No), where Eb represents an averaged energy of an information bit of a transmission channel. The compressed mode is activated when the value falls below the respective threshold.

As can be seen from the diagram, with compressed mode activated it is only possible to achieve a poorer quality for the same Eb/No ratio, with a respective performance loss as a result.

If the threshold value is set low, as in example b of FIG. 2, then a large number of transmission gaps per time unit is required, which leads to a clear performance constraint as described. The large number of transmission gaps is necessary to perform all RSSI measurements and decoding in as short as possible a time before a possible loss of the connection. In the case where the subscriber station is near the radio cell boundaries and the transmission quality is generally already very low, this can lead to a premature loss of the connection.

If, on the other hand, the threshold value is set high, as in example a of FIG. 2, the additional degradation of quality results from compressed mode being activated at an earlier time, but in this case there is sufficient time available for recording and evaluating all the necessary measurements and information. In comparison with example b, this leads to more reliable information about adjacent radio cells potentially suitable for the connection transfer.

Current proposals proceed from a periodic insertion of transmission gaps into the continuous data transmission, with the transmission gaps being used in each case for RSSI determination and decoding of the information sequences of the control channels. However, if said transmission gaps are inserted only with a low periodicity, then the reliability of the information about potentially suitable adjacent radio cells is in turn reduced, and the probability increases of a decoding of radio cells having too low a transmission quality within the best six radio cells determined by the subscriber station.

SUMMARY OF THE INVENTION

One possible object of the invention is to realize a more efficient and more reliable method for activating the compressed mode on the basis of the known method.

The method according will advantageously use in particular in the case where the first radiocommunication system supports an FDD transmission method. The knowledge of the time structure of the synchronization channel of the second radiocommunication system, which supports a GSM transmission method for example, can be used here for targeted insertion of transmission pauses, so-called transmission gaps, into the continuous data transmission in order to receive and evaluate the synchronization channel of the parallel radiocommunication system. In the case of a CDMA subscriber separation method, the transmission pauses are generated for example as described above by a reduction of the spreading factor or by a puncturing of the data to be transmitted. This requires a higher transmitting power for the rest of the data, which in turn worsens the interference situation in the radio cell. A restriction of the number of transmission pauses by the two-stage detection of base stations of the further radiocommunication system thus advantageously permits an increase in the transmission capacity as well as an improvement of the transmission quality.

It is particularly advantageous if the method described is employed in a radiocommunication system realized as a mobile communication system or wireless subscriber line system.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
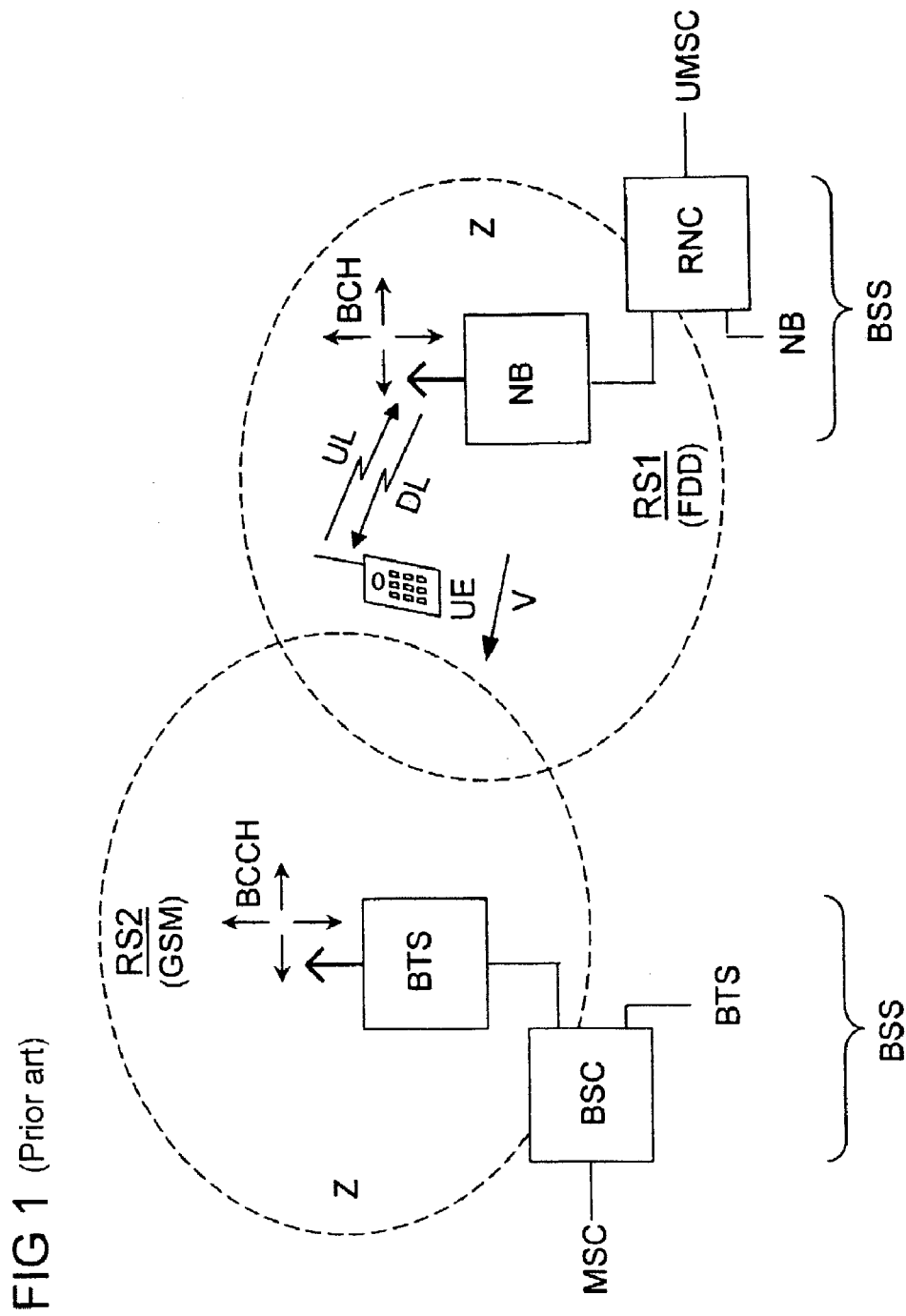
FIG. 1 shows a block circuit diagram of two adjacent radiocommunication systems.

Reference will now be made in detail to the preferred embodiments of the present invention, examples of which are illustrated in the accompanying drawings, wherein like reference numerals refer to like elements throughout.

FIG. 1 shows sections in each case from two mobile communication systems RS1, RS2 as examples of radiocommunication systems. A mobile communication system is composed in each case of a plurality of mobile switching centers MSC or UMSC (UMTS Mobile Switching Center) which belong to a switching network (SSS—Switching Subsystem) and are internetworked, or establish access to a fixed network, and of one or more base station systems BSS (Base Station Subsystem) connected to said mobile switching centers MSC, UMSC in each case. A base station system BSS has in turn at least one device BSC (Base Station Controller) or RNC (Radio Network Controller) for assigning radio resources, as well as at least one base station BTS (Base Transceiver Station) or NB (node B) connected thereto in each case. A base station BTS, NB can establish connections via a radio interface to subscriber stations UE (User Equipment), such as mobile stations or other mobile and stationary terminals for example. At least one radio cell Z is formed by each base station BTS, NB. The size of the radio cell is usually determined by the range of a general signaling channel BCH (Beacon Channel) or BCCH (Broadcast Control Channel), which is transmitted by the base stations BTS, NB with a higher transmitting power than the traffic channels in each case. In the case of sectorization or with hierarchical cell structures, it is also possible to supply a plurality of radio cells per base station BTS, NB. The functionality of this structure can be transferred to and employed in other radiocommunication systems, in particular to subscriber access networks with wireless subscriber lines.

The example of FIG. 1 shows a subscriber station UE which is designed as a mobile station and which moves at a speed V from the radio cell Z of the first mobile communication system RS1, which supports an FDD mode of the UMTS standard, to a radio cell Z of a second mobile communication system RS2, which supports a GSM standard. The subscriber station UE has established a connection to the base station NB, shown by way of example, of the first mobile communication system RS1. During the connection the subscriber station UE periodically evaluates the transmission conditions of the radio interface to its surrounding base stations, such as the aforementioned base station NB of the second mobile communication system RS2 for example, in order, in the event of the transmission quality to the base station NB of the first mobile communication system RS1 becoming degraded for example, to initiate a connection transfer to the base station BTS of the second mobile communication system RS2 with better transmission characteristics. The same method is used for example also in hierarchical network structures when a connection between two different hierarchical levels, for example from a microcell into a macrocell, that are operating in a different frequency band in each case, is transferred.

In future radiocommunication systems, such as the UMTS mobile communication system for example, it should also be possible to implement said connection transfer between radiocommunication systems that support different transmission methods. In this case a voice connection can be transferred from, for example, an FDD system to a GSM system or from a TDD system of a lower hierarchical level of the hierarchical network structure to an FDD or GSM system of a higher hierarchical level. Further scenarios of connection transfer between the same or different systems and transmission methods are conceivable.

Figure 2:
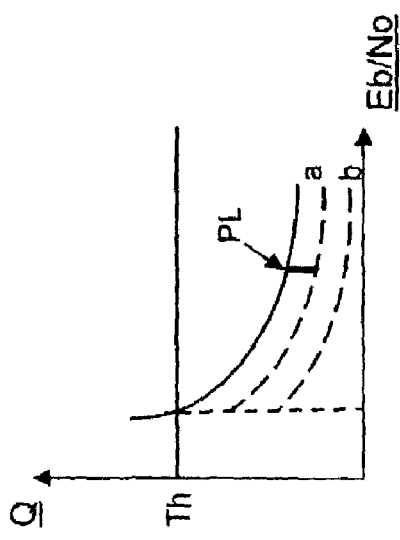
FIG. 2 shows an exemplary diagram for the method according to the prior art.
Figure 3:
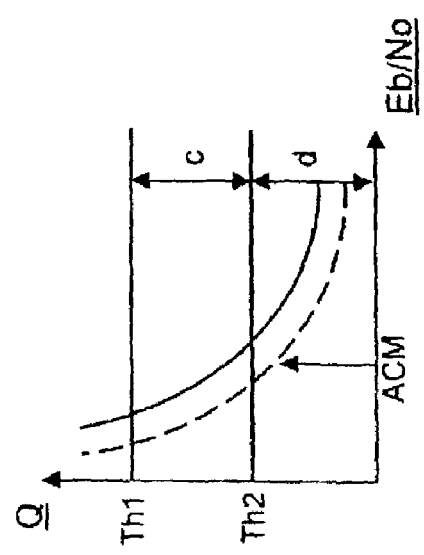
FIG. 3 shows an exemplary diagram corresponding to the method according to one aspect of the invention.

To illustrate the method, FIG. 3 shows by way of example a diagram that corresponds to the diagram in FIG. 2 initially described. In contrast to the known method with a comparison of the determined transmission quality (Q) of the connection to the currently supplying base station with a threshold value, the currently determined transmission quality is compared with two threshold values Th1 and Th2 (Threshold).

If the transmission quality falls below a first threshold value Th1, then the compressed mode is activated at least for transmission in the downlink direction and is signaled to the subscriber station. In contrast to the known method of FIG. 2, the subscriber station UE determines only the RSSI of the surrounding base stations, for example according to a signaled adjacent cell list, in the quality interval between the first Th1 and the second threshold value Th2.

The fact that a plurality of adjacent cells can be observed during a transmission gap enables the period between two successive transmission gaps to be increased up to an upper limit which still permits sufficient reliability of the evaluation and sequence of the observed adjacent cells. Accordingly, the interval PL (Performance Loss) between the two threshold values Th1 and Th2 serves to determine a list with a sequence, for example determined and if appropriate evaluated according to the respective transmission quality, of adjacent radio cells or base stations potentially suitable for a connection transfer. For example the subscriber station UE creates here a list with the six most suitable base stations.

If the transmission quality subsequently falls below the second threshold value Th2, then the subscriber station UE decodes information sequences transmitted by the base stations of the selected adjacent radio cells in a respective control channel. In this case the RSSI is no longer determined, which confers the advantage that no increase in the periodicity for generating the transmission gaps is required. The periodicity already selected for RSSI determination can also be used further for the decoding, so that no further degradation of the transmission quality arises.

The advantageous achievement of the method is that it requires no compromise between RSSI measurements and decoding of information sequences. The concept optimizes the method with respect to a smallest possible periodicity of the transmission gaps with at the same time a reliable ranking of the adjacent cell candidates. The less efficient decoding procedure is only activated if the transmission quality falls below the second threshold value Th2, but said procedure then utilizes the transmission gaps exclusively.

By virtue of the fact that all actions between the first threshold value Th1 and second threshold value Th2 serve to determine the RSSI, the reliability of the decoding of relevant adjacent cell candidates is advantageously increased.

Figure 4:
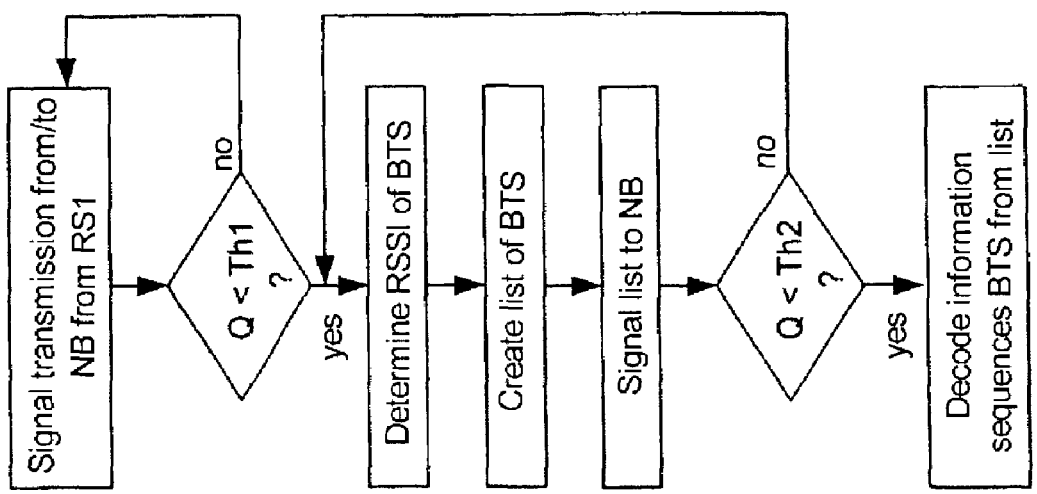
FIG. 4 shows a temporal flow chart of the method according to one aspect of the invention.

FIG. 4 shows the method as a temporal flow chart in accordance with the preceding description of FIG. 3.

The invention has been described in detail with particular reference to preferred embodiments thereof and examples, but it will be understood that variations and modifications can be effected within the spirit and scope of the invention.

The invention claimed is:

1. A method for controlling an intersystem connection transfer from a first radiocommunication system having a first transmission method to a second radiocommunication system having a second transmission method, comprising:
in a first step, determining a transmission quality at a subscriber station, with respect to transmission characteristics from the subscriber station to a supplying base station of the first radiocommunication system;
comparing the transmission quality with a first threshold value;
activating a compressed mode if the transmission quality falls below the first threshold value, the compressed mode generating at least one transmission gap in a time frame of the first transmission method;
determining transmission characteristics at the subscriber station with respect to a base station of the second radiocommunication system within the at least one transmission gap;
comparing the transmission quality with a second threshold value;
in a subsequent second step, detecting, at the subscriber station, information sequences transmitted by the base station of the second radiocommunication system in a control channel only if the transmission quality with respect to transmission characteristics from the subscriber station to the supplying base station of the first radiocommunication system falls below the second threshold; and
selecting the base station of the second radio communication system for the connection transfer on the basis of the determined transmission characteristics and the detected information sequences.

2. The method as claimed in claim 1, wherein the transmission quality is determined by evaluating a receiving level signal strength.

3. The method as claimed in claim 2, wherein a periodicity for generating transmission gaps is selected depending on a current transmission quality with respect to the supplying base station of the first radiocommunication system.

4. The method as claimed in claim 3 wherein
timing for generating transmission gaps is determined by the base station of the first radiocommunication system, and
the timing is signaled to the subscriber station.

5. The method as claimed in claim 4, wherein the timing for generating transmission gaps includes information regarding at least one of a start time for generating transmission gaps and a periodicity for generating transmission gaps.

6. The method as claimed in claim 5, wherein the compressed mode is activated for signal transmission in at least one of an uplink direction and a downlink direction.

7. The method as claimed in claim 6, wherein the subscriber station transmits at least one of the transmission quality and the transmission characteristics to at least one of the base station of the first radiocommunication system and the base station of the second radiocommunication system.

8. The method as claimed in claim 7, wherein the first radiocommunication system supports a Frequency Division Duplex transmission (FDD) method, and the second radiocommunication system supports a Time Division Duplex (TDD) transmission method or a Global System for Mobile Communication (GSM) transmission method.

9. The method as claimed in claim 1, wherein a periodicity for generating transmission gaps is selected depending on a current transmission quality with respect to the supplying base station of the first radiocommunication system.

10. The method as claimed in claim 1, wherein
timing for generating transmission gaps is determined by the base station of the first radiocommunication system, and
the timing is signaled to the subscriber station.

11. The method as claimed in claim 10, wherein the timing for generating transmission gaps includes information regarding at least one of a start time for generating transmission gaps and a periodicity for generating transmission gaps.

12. The method as claimed in claim 1, wherein the compressed mode is activated for signal transmission in at least one of an uplink direction and a downlink direction.

13. The method as claimed in claim 1, wherein the subscriber station transmits at least one of the transmission quality and the transmission characteristics to at least one of the base station of the first radiocommunication system and the base station of the second radiocommunication system.

14. The method as claimed in claim 1, wherein the first radiocommunication system supports a Frequency Division Duplex transmission (FDD) method, and the second radiocommunication system supports a Time Division Duplex (TDD) transmission method or a Global System for Mobile Communication (GSM) transmission method.

15. A subscriber station to control an intersystem connection transfer from a base station of a first radiocommunication system having a first transmission method to a base station of a second radiocommunication system having a second transmission method, the subscriber station comprising:
a first determination unit to determine, in a first step, a transmission quality, with respect to transmission characteristics with a supplying base station of the first radiocommunication system;
a first comparison unit to compare the transmission quality with a first threshold value;
an activation unit to activate a compressed mode if the transmission quality falls below the first threshold value, the compressed mode generating at least one transmission gap in a time frame of the first transmission method;
determining transmission characteristics at the subscriber station with respect to a base station of the second radiocommunication system within the at least one transmission gap;
a second comparison unit to compare the transmission quality with a second threshold value;
a detection unit to detect, in a subsequent second step, at the subscriber station, information sequences transmitted by the base station of the second radiocommunication system in a control channel only if the transmission quality with respect to transmission characteristics from the subscriber station to the supplying base station of the first radiocommunication system falls below the second threshold; and
a selection unit to select a suitable base station of the second radio communication system for the connection transfer on the basis of the determined transmission characteristics and the detected information sequences.

16. A method for controlling an intersystem connection transfer from a first radiocommunication system having a first transmission method to a second radiocommunication system having a second transmission method, comprising:

- in a first step, determining a transmission quality at a subscriber station, with respect to transmission characteristics from the subscriber station to a supplying base station of the first radiocommunication system;
- comparing the transmission quality with a first threshold value;
- activating a compressed mode if the transmission quality falls below the first threshold value, the compressed mode generating at least one transmission gap in a time frame of the first transmission method;
- determining transmission characteristics at the subscriber station with respect to a base station of the second radiocommunication system within the at least one transmission gap;
- comparing the transmission quality with a second threshold value;
- in a subsequent second step, detecting, at the subscriber station, information sequences transmitted by the base station of the second radiocommunication system in a control channel only if the transmission quality with respect to transmission characteristics from the subscriber station to the supplying base station of the first radiocommunication system falls below the second threshold; and
- selecting the base station of the second radio communication system for the connection transfer on the basis of the determined transmission characteristics and the detected information sequences.

* * * * *